United States Patent

[11] 3,628,098

| [72] | Inventor | Rex E. Sturdivan<br>Hacienda Heights, Calif. |
|---|---|---|
| [21] | Appl. No. | 28,691 |
| [22] | Filed | Apr. 15, 1970 |
| [45] | Patented | Dec. 14, 1971 |
| [73] | Assignee | Zinsco Electrical Products<br>Los Angeles, Calif. |

[54] CABINET FOR ELECTRICAL CONTROLS WITH ENCLOSED BUS BARS AND OPPOSED DOORS
10 Claims, 12 Drawing Figs.

[52] U.S. Cl. .................................................... 317/120,
49/365, 312/257 SM
[51] Int. Cl. ...................................................... H02b 1/06,
H02b 1/20
[50] Field of Search............................................ 49/365,
371; 174/68 B, 70 B, 100; 312/199, 257 A, 257
SM, 257 SK, 309, 320, 323, 324; 317/120, 119

[56] References Cited
UNITED STATES PATENTS

| 1,782,344 | 11/1930 | Gourley.......................... | 312/257 SK |
| 3,469,149 | 9/1969 | Paape............................ | 317/120 |
| 3,495,135 | 2/1970 | Paape............................ | 317/119 |

FOREIGN PATENTS

| 838,075 | 6/1960 | Great Britain................ | 49/365 |

Primary Examiner—Lewis H. Myers
Assistant Examiner—Gerald P. Tolin
Attorney—Harris, Kiech, Russell & Kern ABSTRACT: A cabinet for electrical controls or the like, typically a motor control center, with a minimum of cabinet components. A cabinet formed solely of opposed sideplates, sills and headers, all of sheet metal. A bus bar assembly positioned between the sideplates providing insulators for bus bar support, an enclosure for the bus bars and a barrier for front and rear cabinet portions. Opposed doors for the cabinet openings with the doors meeting intermediate the sideplates at a swingaway stop for access to the cabinet interior.

Patented Dec. 14, 1971
3,628,098
3 Sheets-Sheet 1
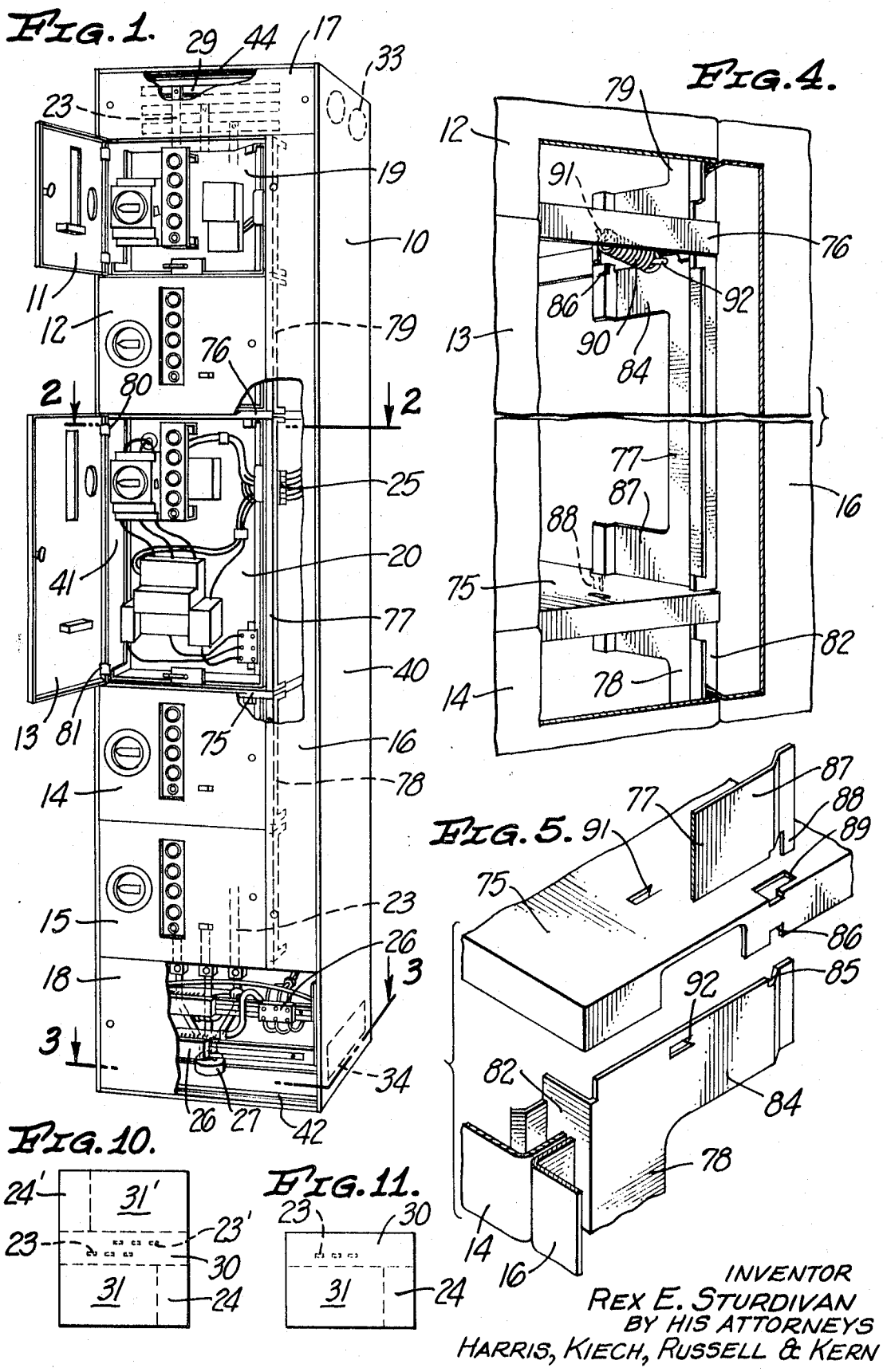
INVENTOR
REX E. STURDIVAN
BY HIS ATTORNEYS
HARRIS, KIECH, RUSSELL & KERN

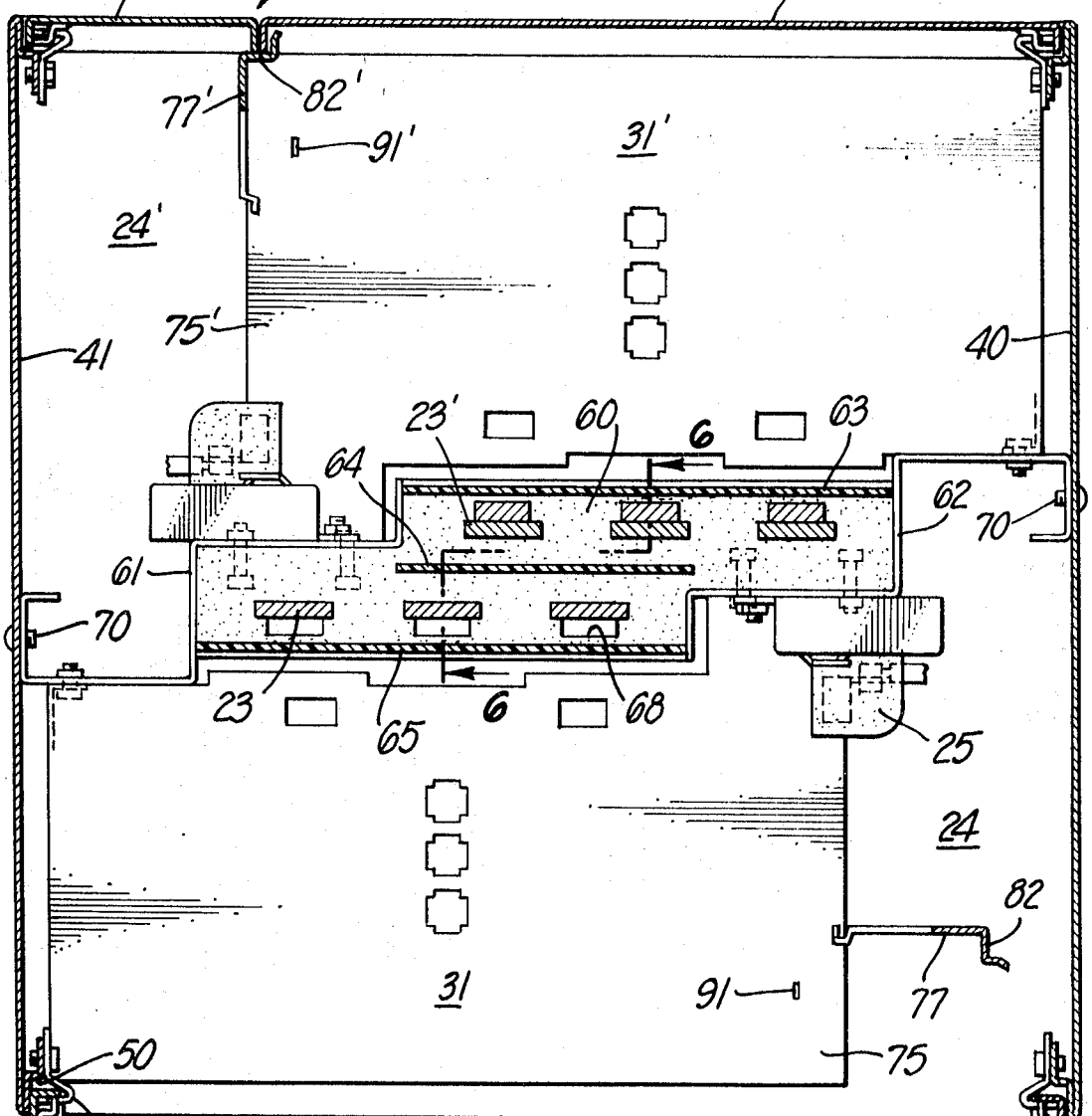
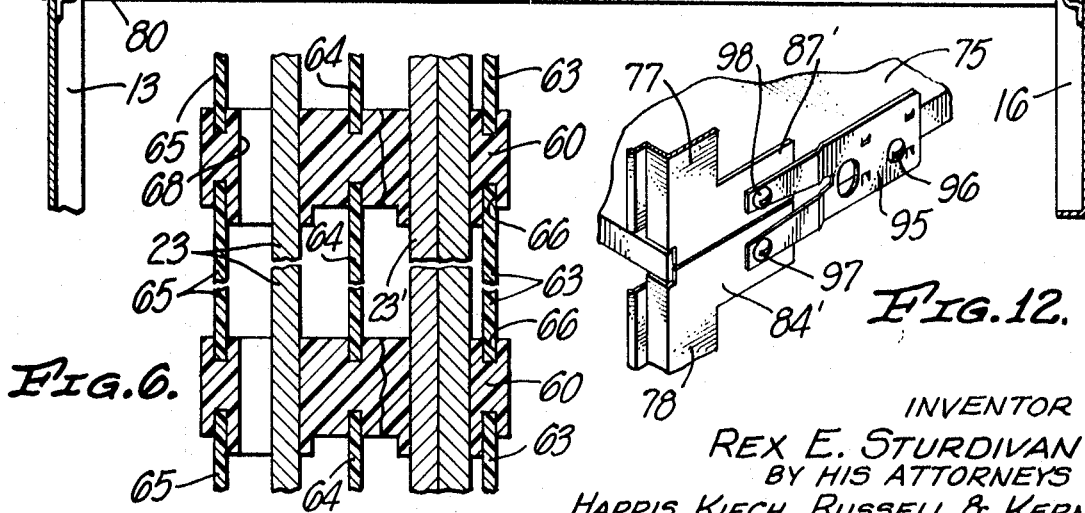

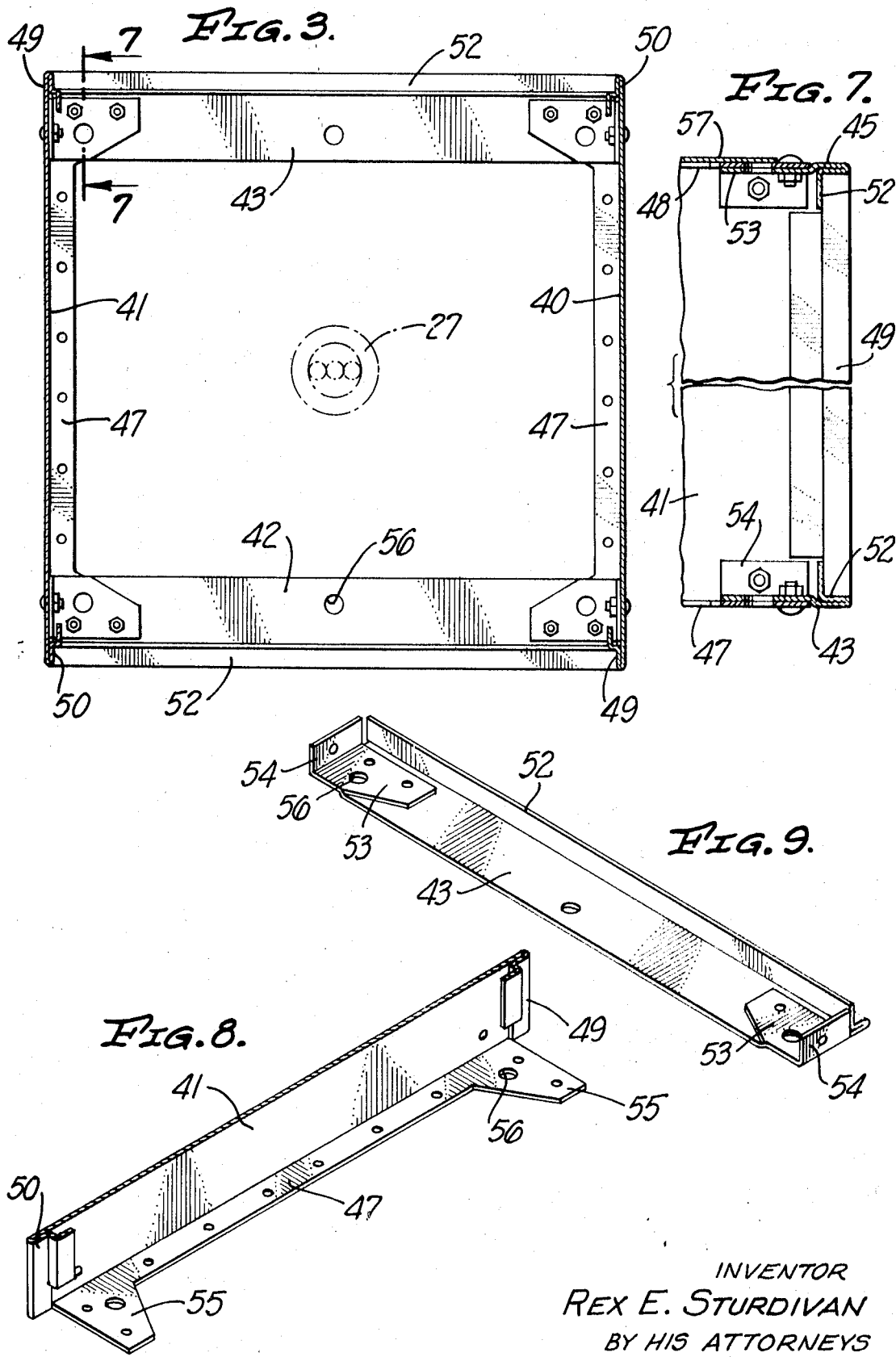

CABINET FOR ELECTRICAL CONTROLS WITH ENCLOSED BUS BARS AND OPPOSED DOORS

This invention relates to a cabinet for electrical controls and the like, typically electrical motor controls, and is sometimes known as a motor control center because the control equipment for a plurality of motors is at one location.

By way of example, a motor control center will comprise an upright cabinet or housing having line side conductors in the form of bus bars running vertically through the cabinet. A plurality of plug-in motor control units are mounted in the cabinet, one above the other, and make connection to the bus bars. Output or load conductors from each control unit and control conductors from each control unit are also contained in the cabinet. Means are provided for connecting large-size line side conductors to the bus bars. The load and control conductors run to one or more terminal boards within the housing.

A typical cabinet will have fixed sides with front and rear openings, with a stack of motor control units positioned to one side (typically the left) and with a vertical load and control conductor section at the other side (typically the right). The rear portion of the cabinet may be a duplicate of the front portion, providing two stacks of motor control units in a single cabinet, each having the same configuration when viewed by the operator. A cabinet providing such front and rear service will have the bus bars in the center and will be asymmetrical as viewed in the horizontal plane. The cabinets normally have separate doors for each motor control unit and another door for the conductor section.

The basic cabinet or housing for a motor control center has been manufactured in a variety of ways in the past, and it is an object of the present invention to provide a new and improved cabinet having a minimum number of parts and requiring a minimum number of manufacturing and assembly steps. The cabinet of the present invention contemplates a pair of sheet metal sideplates with a pair of sill members at the bottom and a pair of header members at the top, with the members joined directly to the sideplates at the corners to complete the basic cabinet construction, without requiring additional corner angles or stiffener sections or reinforcing plates or the like.

It is another object of the invention to provide a bus bar assembly for positioning within the cabinet, which assembly can be put together outside the cabinet and installed as a unit, with the assembly providing an enclosure for the bus bars and providing a barrier for separating front and rear portions of the cabinet, while requiring a minimum number of different components and being usable for both single cabinets and dual cabinets.

The doors for the individual control units and for the conductor section are hinged at the edges of the sideplates and swing toward each other substantially meeting intermediate the sideplates. In order to comply with certain design requirements, the zone at which the doors come together must incorporate a barrier blocking access to the interior of the cabinet, and this normally achieved by providing a fixed stop plate in the cabinet intermediate the sides. The fixed stop plate makes access to the interior difficult and complicates wiring and maintenance procedures. Accordingly, it is another object of the present invention to provide a new and improved door stop and barrier construction for a cabinet, with the stop normally positioned at the door-closed position and with the stop being readily movable providing access to the interior of the cabinet.

The invention also comprises novel details of construction and novel combinations and arrangements of parts, which will more fully appear in the course of the following description. The drawings merely show and the description merely describes the preferred embodiment of the present invention which is given by way of illustration or example.

In the drawings:

FIG. 1 is an isometric view of a motor control center incorporating a preferred embodiment of the present invention;

FIG. 2 is an enlarged sectional view taken along the line 2—2 of FIG. 1;

FIG. 3 is an enlarged sectional view taken along the line 3—3 of FIG. 1;

FIG. 4 is an enlarged view of a portion of the front of the cabinet of FIG. 1 illustrating the door and doorstop configuration;

FIG. 5 is a view similar to that of FIG. 4 illustrating the pivotal mounting of the swinging door stops;

FIG. 6 is an enlarged partial sectional view taken along the line 6—6 of FIG. 2;

FIG. 7 is an enlarged partial sectional view taken along the line 7—7 of FIG. 3;

FIG. 8 is an enlarged isometric view of the lower portion of a sideplate of the cabinet of FIG. 1;

FIG. 9 is an enlarged isometric view of a sill member of the cabinet of FIG. 1;

FIG. 10 is a diagrammatic top view of the cabinet of FIG. 1 showing the dual cabinet arrangement;

FIG. 11 is a view similar to that of FIG. 10 showing a single cabinet arrangement; and FIG. 12 is a view similar to that of FIG. 5 illustrating an alternative mounting for the door stops.

The motor control center of FIG. 1 includes a cabinet or housing 10 with hinged doors 11, 12, 13, 14 and 15 positioned one above the other and another door 16 opposite the doors 11–15. A removable panel 17 may be positioned at the upper end of the cabinet and another removable panel 18 may be positioned at the lower end of the cabinet.

Various motor control units 19, 20 may be installed in the spaces behind the doors 11–15. Line side bus bars 23, 23' are disposed vertically in the space 30 behind the control units 19, 20 and the control units may be connected to the bus bars by conventional stab terminals (not shown). The load side wiring and the control wiring is disposed in the space 24 behind the door 16, running between terminal boards 25 adjacent the control units and terminal boards 26 disposed in the space behind the panel 18. In a typical installation, a motor control unit plugs into the terminal board 25 as the control unit is inserted into the cabinet.

The line cables may enter the cabinet through the bottom, with a line conduit 27 terminating within the cabinet with the individual line cables connected to corresponding bus 23. Alternatively, the line cable may enter through the upper portion of the cabinet and be connected to horizontal bus 29 which in turn are connected to the vertical bus 23. The horizontal bus provide for interconnections between cabinets which are mounted side by side. The vertical bus 23 are in the space 30 behind the space 24 and the space 31 containing the motor control units. Two sets of motor control units may be mounted back to back in a single cabinet, as illustrated in FIGS. 1 and 10, with both sets of bus 23, 23' in the central space 30, and with the spaces 24', 31' corresponding to the spaces 24, 31, respectively. Alternatively, a single stack of motor control units may be utilized with the cabinet configuration of FIG. 11.

The exterior wires for the load conductors and control conductors may enter the cabinet in any conventional manner, through the bottom, top, the back, or either side as desired. Typical entry openings are indicated at 33 and 34.

The cabinet 10 is formed of opposing sideplates 40, 41 which are joined at the bottom by sill members 42, 43 and at the top by similar header members 44, 45 (FIGS. 3 and 7.) The sideplates 40, 41 are identical and each is formed of a single piece of sheet metal with an inwardly turned flange 47 at the bottom and with a similar flange 48 at the top. Ribs 49, 50 may be provided along the vertical edges of the sideplate by appropriate bending operation.

The sill members 42, 43 and the header members 44, 45 may be identical and one such member is shown in FIG. 9. Each of the sill and header members may be formed of a single piece of sheet metal, with a rib 52 along the outer edge and with a stepped portion 53 at each end and terminating in an upward bracket 54. The stepped sections 53 have the configuration of the outer portion 55 of the flange 47 of the sideplates, so that the stepped sections may overlie the flanges, as illustrated in FIGS. 3 and 7, to provide a planar bottom and a planar top for the cabinet.

The sideplates 40, 41, the sill members 42, 43 and the header members 44, 45 are bolted together as illustrated in FIGS. 3 and 7, to form the complete cabinet. The large openings 56 in the sideplate flanges and sill and header members provide for holddown bolts at the bottom and for lifting eyes at the top. The cabinet ordinarily sits on a floor or pad with an open bottom area providing access for conduit coming through the floor. When desired, a cover plate 57 may be used to close the top opening. In the dual cabinet arrangement, the front and back openings are closed with plates and doors as illustrated in FIG. 1. In the single cabinet configuration of FIG. 11, the rear opening may be closed by a single large plate.

Thus it is seen that the complete cabinet is formed of six pieces of sheet metal, appropriately folded, without requiring separate or additional corner angles or brackets or reinforcing members.

The bus bars 23, 23' are supported in a plurality of bus insulator blocks 60. The bus insulator blocks are bolted to block support plates 61, 62 in a spaced vertical arrangement, with insulator plates 63, 64, 65 positioned in grooves 66 of the insulator blocks 60.

In the embodiment illustrated, six generally hat-shaped openings 68 are provided in each bus insulator block 60 for receiving the bus bars. For lower load requirements, a single bus bar may be positioned in each opening 68, as illustrated at 23 in FIGS. 2 and 6. For higher load requirements, two bus bars may be positioned in each opening 68, as illustrated at 23'.

When the bus insulator blocks 60 are fastened to the block support plates 61, 62, with the insulator plates 63, 65, in place, the support plates and the insulator plates provide a complete enclosure for the bus bars. The interior insulator plates 64 provide isolation between the two sets of bus 23, 23'. This bus bar assembly may be fully assembled outside of the cabinet and then installed into a cabinet as a unit, with the support plates 61, 62 fastened to the sideplates 41, 40 by screws 70. The installed bus bar assembly then provides a barrier between the front portion of the cabinet indicated generally at 31, and the rear portion of the cabinet indicated generally at 31'.

The block support plates 61, 62 may each be formed of a single piece of sheet metal, and while being asymmetrical in configuration to provide the asymmetrical location of the bus bar, the two block support plates may be identical, thereby further reducing the number of different parts required in the manufacture of the cabinet.

Each of the motor control units rests on a shelf positioned in the cabinet at the appropriate level, with each shelf bolted to the block support plates 61, 62 and to the rib 50, as illustrated by the shelf 75 in FIG. 2. A doorstop is provided between each pair of shelves, with the stop 77 between shelves 75, 76, and with the stop 78 between shelf 75 and the next lower one, and with stop 79 between shelf 76 and the next higher one (FIG. 4). The door 13 is carried by hinges 80, 81, with the hinges being fastened to the rib 50 of the sideplate 41. The other doors for the motor control units and the door 16 for the conductor section 24 are similarly mounted on hinges, with the doors when closed substantially closing the front opening and similarly the rear opening of the cabinet. The doors 13' and 16' are shown in the closed position engaging the jamb 82' of the door stop 77', in FIG. 2. There is a space indicated at 83, where the two doors nearly meet and the jamb 82 of the doorstop provides a barrier at this space so that a knife or other thin object cannot be inserted into the interior of the cabinet.

In the cabinet of the invention, the doorstops are pivotally mounted so that they can be moved to one side for insertion of a control unit and to provide access to the interior of the cabinet, particularly to the wiring at the terminal blocks 25. Each of the doorstops preferably is generally U-shaped, with an upper arm 84 having a notch 85 for pivotal engagement with a corresponding notch 86 in the shelf (FIG. 5). Similarly, each doorstop has a lower arm 87 with a depending section 88 pivotally engaging an opening 89 in the shelf. A spring 90 is mounted between a hook 91 in the shelf and another hook 92 in the doorstop for urging the doorstop to the normal or blocking position as shown in the upper section of FIG. 2 and in FIGS. 4 and 5. When the appropriate doors are open, the doorstop may be pivoted to the side, as shown in the lower portion of FIG. 2, providing direct access through the central portion of the doorstop to the wiring connections in the interior of the cabinet. This construction provides the desired blocking at the zone where the opposing doors substantially meet while at the same time not obstructing the interior of the cabinet for installation and maintenance work.

An alternative construction which provides more limited pivoting of the doorstops is shown in FIG. 12. A bifurcated spring plate 95 is mounted on the shelf 75 by a screw 6. One arm of the plate 95 is fastened to the arm 84' of the stop 78 by a screw 97 and the other arm of the plate 95 is fastened to the arm 87' of the stop 77 by a screw 98. With this construction each doorstop is supported between two spring plates. The spring plates urge the stops against the shelves, as seen in FIG. 12. The stops may be moved manually counterclockwise as viewed from above, against the spring action providing clearance for insertion and removal of control units.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:

1. A cabinet for electrical controls or the like, including in combination opposed sideplates defining a front opening and a rear opening between said sideplates, each of said sideplates comprising a single sheet of metal with an inwardly turned flange at the bottom and at the top thereof;

a pair of sill members and a pair of header members, with a sill member and a header member positioned between and connected to said sideplates at said front opening and with a sill member and a header member positioned between and connected to said sideplates at said rear opening; and closure means carried on said sideplates for closing said front and rear openings;

each of said sill and header members comprising a single sheet of metal with a stepped portion at each end directly engaged with a sideplate flange so that said sideplate flanges and sill and header members provide a planar top and a planar bottom for said cabinet.

2. A cabinet as defined in claim 1 in which each of said sideplates has an inwardly turned rib at each vertical edge and each of said sill and header members has an inwardly turned rib at its outer edge, with said ribs forming a rim about the front opening and about the rear opening.

3. A cabinet as defined in claim 1 including:

a plurality of bus insulator blocks;

a pair of elongated block support plates;

first connector means fastening each of said bus insulator blocks between said pair of block support plates in vertical spaced relation;

a plurality of vertically disposed bus bars positioned in said bus insulator blocks;

a plurality of insulator plates, with an insulator plate mounted between adjacent bus insulator blocks and with said insulator plates and pair of block support plates coacting to provide an enclosure for said plurality of bus bars with said bus bars and block support plates disposed parallel to each other; and second connector means mounting each of said block support plates to a cabinet sideplate intermediate said front and rear openings, with said block support plates and insulator plates coacting to provide a barrier defining front and rear portions in said cabinet.

4. A cabinet as defined in claim 3 in which each of said bus insulator blocks includes first and second sets of openings for bus bars, with said first set displaced laterally from said second set, and in which said block support plates comprise single sheets of metal having identical asymmetrical cross-sectional configurations.

5. A cabinet as defined in claim 3 in which said closure means includes first and second doors hinged at opposite sideplates with said doors when closed being adjacent one another at a vertical zone intermediate said sideplates;

and including a doorstop in said cabinet for pivoting about a vertical axis and having a jamb and spring means urging said doorstop to a stop position with said jamb at said vertical zone closing the space between said doors, said doorstop being movable away from said stop position against the urging of said spring means providing access to the space behind said zone.

6. A cabinet as defined in claim 5 in which said doorstop is generally U-shaped comprising a vertical jamb with horizontal arms at the upper end lower ends, and including spring plates supporting said door stop at the free ends of said arms.

7. A cabinet for electrical controls or the like and having a front opening between opposing sideplates, including in combination:

first and second doors for said front opening and hinged at opposite sideplates with said doors when closed being adjacent one another at a vertical zone intermediate said sideplates;

a doorstop in said cabinet for pivoting about a vertical axis and having a jamb and spring means urging said doorstop to a stop position with said jamb at said vertical zone closing the space between said doors, said doorstop being movable away from said stop position against the urging of said spring means providing access to the space behind said zone;

a plurality of bus insulator blocks;

a pair of block support plates;

first connector means fastening said bus insulator blocks between said block support plates in vertical spaced relation;

a plurality of vertically disposed bus bars positioned in said bus insulator blocks;

a plurality of insulator plates, with an insulator plate mounted between adjacent bus insulator blocks and with said insulator plates and block support plates coacting to provide an enclosure for said bus bars; and second connector means mounting each of said block support plates to a cabinet sideplate intermediate said front and rear openings, with said block support plates and insulator plates providing a barrier defining front and rear portions in said cabinet.

8. A cabinet as defined in claim 7 in which each of said bus insulator blocks includes first and second sets of openings for bus bars, with said first set displaced laterally from said second set, and in which said block support plates comprise single sheets of metal having identical asymmetrical cross-sectional configurations.

9. A cabinet for electrical controls or the like, including in combination:

opposed sideplates defining a front opening and a rear opening between said sideplates, each of said sideplates comprising a single sheet of metal with an inwardly turned flange at the bottom and at the top thereof;

a pair of sill members and a pair of header members, with a sill member and a header member connected between said sideplates at said front opening and with a sill member and a header member connected between said sideplates at said rear opening;

closure means carried on said sideplates for closing said front and rear openings;

said closure means including first and second doors hinged at opposite sideplates with said doors when closed being adjacent one another at a vertical zone intermediate said sideplates; and a doorstop in said cabinet for pivoting about a vertical axis and having a jamb and spring means urging said doorstop to a stop position with said jamb at said vertical zone closing the space between said doors, said doorstop being movable away from said stop position against the urging of said spring means providing access to the space behind said zone.

10. A cabinet as defined in claim 9 in which said doorstop is generally U-shaped comprising a vertical jamb with horizontal arms at the upper and lower ends, and including spring plates supporting said doorstop at the free ends of said arms.

* * * * *